(12) United States Patent
Lee et al.

(10) Patent No.: US 9,030,995 B2
(45) Date of Patent: May 12, 2015

(54) METHOD AND APPARATUS FOR TRANSMITTING PAGING MESSAGE IN WIRELESS COMMUNICATION SYSTEM

(75) Inventors: Jin Lee, Anyang-si (KR); Young Soo Yuk, Anyang-si (KR); Gi Won Park, Anyang-si (KR); Jeong Ki Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 132 days.

(21) Appl. No.: 13/427,700

(22) Filed: Mar. 22, 2012

(65) Prior Publication Data

US 2012/0263106 A1    Oct. 18, 2012

Related U.S. Application Data

(60) Provisional application No. 61/474,729, filed on Apr. 12, 2011, provisional application No. 61/479,385, filed on Apr. 26, 2011.

(30) Foreign Application Priority Data

Feb. 10, 2012    (KR) .......................... 10-2012-0013529

(51) Int. Cl.
*H04W 4/00* (2009.01)
*H04W 68/00* (2009.01)

(52) U.S. Cl.
CPC .............. *H04W 4/005* (2013.01); *H04W 68/00* (2013.01)

(58) Field of Classification Search
CPC ........ H04W 68/00; H04W 60/00; H04W 4/00
USPC .................... 370/311, 328–329; 455/450, 458
See application file for complete search history.

(56) References Cited

U.S. PATENT DOCUMENTS

| 2010/0279676 | A1 | 11/2010 | Benn et al. | |
|---|---|---|---|---|
| 2011/0223942 | A1* | 9/2011 | Xu et al. | 455/458 |
| 2012/0179789 | A1* | 7/2012 | Griot et al. | 709/220 |
| 2013/0040678 | A1* | 2/2013 | Lee et al. | 455/509 |
| 2013/0121300 | A1* | 5/2013 | Cho et al. | 370/329 |

FOREIGN PATENT DOCUMENTS

| EP | 2 456 237 A1 | 5/2012 |
|---|---|---|
| WO | WO 2011/006437 A1 | 1/2011 |
| WO | 2011/018419 A1 | 2/2011 |

OTHER PUBLICATIONS

LG Electronics Inc., "Extension of paging cycle for MTC", 3GPP TSG-RAN WG2 #71, Madrid, Spain, Aug. 23-28, 2010, R2-104560.

(Continued)

*Primary Examiner* — Iqbal Zaidi
(74) *Attorney, Agent, or Firm* — McKenna Long & Aldridge LLP

(57) ABSTRACT

A method and apparatus for transmitting uplink (UL) data in a wireless communication system is provided. A machine-to-machine (M2M) device receives a deregistration response message including a transmission type and a maximum number of paging cycle during an idle mode entry, waits to receive a paging message for the M2M device to transmit the UL data during a period corresponding to up to (the maximum number of paging cycle×a length of paging cycle), and transmits the UL data.

12 Claims, 15 Drawing Sheets

(56) References Cited

OTHER PUBLICATIONS

3rd Generation Partnership Project, "Technical Specification Group Radio Access Network, Study on RAN improvements for Machine-type communications, Release 10", 3GPP TR 37.868, V0.7.0, Oct. 2010.

Interdigital Communications: "Triggering a detached MTC device", 3GPP Draft; S2-110673_Triggering_a_Ditached_Device_Disc, 3rd Generation Partnership Project (3GPP), Mobile Competence Centre; 650, Route Des Lucioles; F-06921 Sophia-Antipolis Cedex; France, vol. SA WG2, no. Salt Lake City; 20110221, Feb. 15, 2011, XP050523859.

Huawei et al: "Triggering of non-attached MTC device", 3GPP Draft; S2-110651, 3rd Generation Partnership Project (3GPP), Mobile Competence Centre; 650, Route Des Lucioles; F-06921 Sophia-Antipolis Cedex; France, vol. SA WG2, no. Salt Lake City; 20110221, Feb. 15, 2011, XP050523839.

Ericsson et al: "Pull vs Push approach for MTC", 3GPP Draft; R2-104007, 3rd Generation Partnership Project (3GPP), Mobile Competence Centre; 650, Route Des Lucioles; F-06921 Sophia-Antipolis Cedex; France, vol. RAN WG2, no. Stockholm, Sweden; 20100628, Jun. 22, 2010, XP050451340.

\* cited by examiner

METHOD AND APPARATUS FOR TRANSMITTING PAGING MESSAGE IN WIRELESS COMMUNICATION SYSTEM

CROSS-REFERENCE TO RELATED APPLICATIONS

This application claims the benefit of priority of U.S. Provisional Application No. 61/474,729, filed on Apr. 12, 2011, U.S. Provisional Application No. 61/479,385, filed on Apr. 26, 2011, and Korean Patent Application No. 10-2012-0013529, filed on Feb. 10, 2012, all of which are hereby incorporated by reference in their entirety herein.

BACKGROUND OF THE INVENTION

1. Field of the Invention

The present invention relates to wireless communications, and more particularly, to a method and apparatus for transmitting a paging message in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., 4th generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

There is ongoing development on the institute of electrical and electronics engineers (IEEE) 802.16p standard optimized for machine-to-machine (M2M) communication based on the IEEE 802.16e standard and the IEEE 802.16m standard. The M2M communication can be defined as an information exchange performed between a subscriber station and a server or between subscriber stations in a core network without any human interaction. In the IEEE 802.16p standard, there is an ongoing discussion on enhancement of medium access control (MAC) of the IEEE 802.16 standard and a minimum change of an orthogonal frequency division multiple access (OFDMA) physical layer (PHY) in licensed bands. Due to the discussion on the IEEE 802.16p standard, a wide area wireless coverage is required in the licensed band, and a scope of applying automated M2M communication can be increased for an observation and control purpose.

When accessing a network, requirements demanded by many M2M applications are significantly different from requirements for human-initiated or human-controlled network access. The M2M application can include vehicular telematics, healthcare monitoring of bio-sensors, remote maintenance and control, smart metering, an automated service of a consumer device, etc. The requirements of the M2M application can include very lower power consumption, larger numbers of devices, short burst transmission, device tampering detection and reporting, improved device authentication, etc.

A paging message is a media access control (MAC) message received from a base station (BS) in every paging cycle by a machine-to-machine (M2M) device operating in an idle mode. Meanwhile, most M2M applications have a traffic characteristic in which a relatively small-sized message is transmitted through an uplink (UL) at a fixed position. In addition, such UL traffic is mostly used for a non-realtime periodic report. Therefore, there is a need for a method for effectively performing the non-realtime periodic report to the BS by the M2M device.

SUMMARY OF THE INVENTION

The present invention provides a method and apparatus for transmitting a paging message in a wireless communication system. The present invention also provides a method of using a paging message for triggering uplink data transmission of a machine-to-machine (M2M) device.

In an aspect, a method of transmitting, by a machine-to-machine (M2M) device, uplink (UL) data in a wireless communication system is provided. The method includes receiving, from a base station, a paging message including an indicator for the M2M device to transmit the UL data, and on receiving the paging message, transmitting, to the base station, the UL data based on the indicator for the M2M device to transmit the UL data.

The indicator for the M2M device to transmit the UL data may be one bit.

If a value of the indicator for the M2M device to transmit the UL data is 1, the UL data transmission of the M2M device may be indicated.

The paging message may be broadcast.

The M2M device may be fixed.

The UL data may be non-real time UL data.

In another aspect, a method for transmitting, by a machine-to-machine (M2M) device, uplink (UL) data in a wireless communication system is provided. The method includes receiving, from a base station, a deregistration response message including a transmission type and a maximum number of paging cycle during an idle mode entry, waiting to receive a paging message for the M2M device to transmit the UL data during a period corresponding to up to (the maximum number of paging cycle×a length of paging cycle), and transmitting, to the base station, the UL data.

The transmission type may be one bit.

A value of the transmission type may be 1.

If the value of the transmission type is 1, the transmission type may indicate that the UL data transmission is allowed only after the M2M device receives the paging message for the M2M device to transmit the UL data.

If the paging message is received during a period corresponding to (the maximum number of paging cycle×paging cycle), the UL data may be transmitted right after receiving the paging message.

If the paging message is not received during the period corresponding to (the maximum number of paging cycle× paging cycle), the UL data may be transmitted after the expiration of the period corresponding to (the maximum number of paging cycle×paging cycle).

The paging message may include an indicator for the M2M device to transmit the UL data, and a value of the indicator is 1.

The paging message may be broadcast.

In another aspect, a machine-to-machine (M2M) device in a wireless communication system is provided. The M2M device includes a radio frequency (RF) unit for transmitting or receiving a radio signal, and a processor coupled to the RF unit, wherein the processor is configured for receiving, from a base station, a paging message including an indicator for the M2M device to transmit the UL data, and on receiving the paging message, transmitting, to the base station, the UL data based on the indicator for the M2M device to transmit the UL data.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11(Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m is chiefly described as an example in order to clarify the description, but the technical spirit of the present invention is not limited to IEEE 802.16m.

Figure 1:
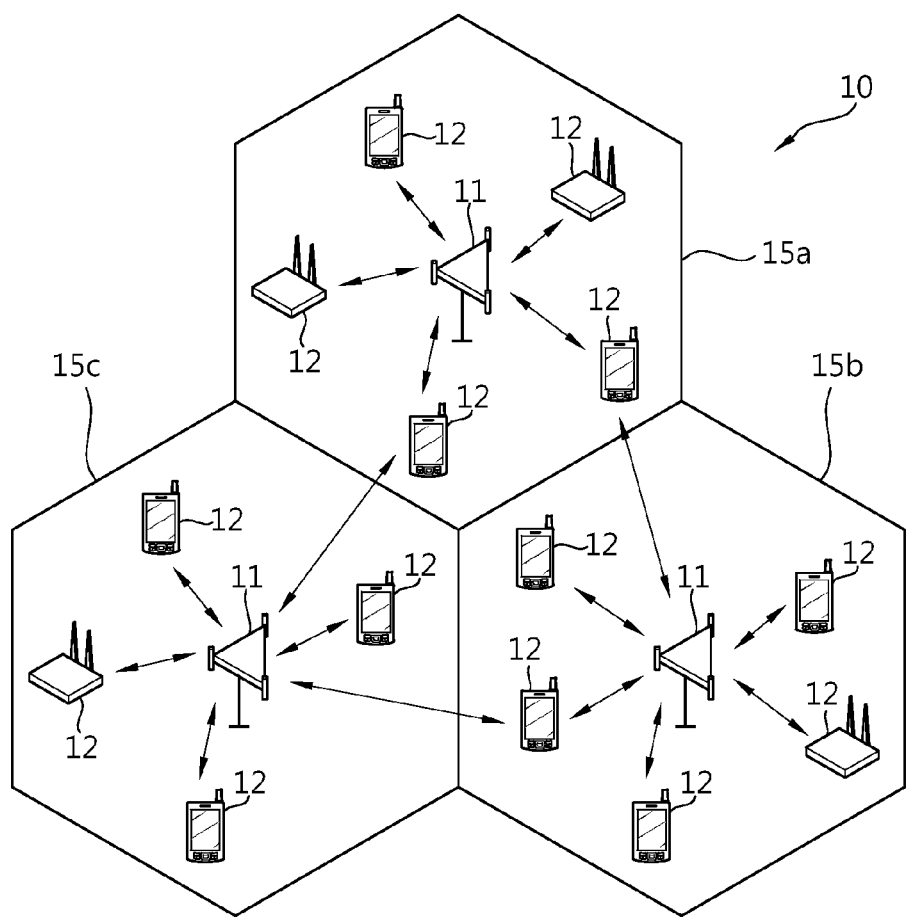
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
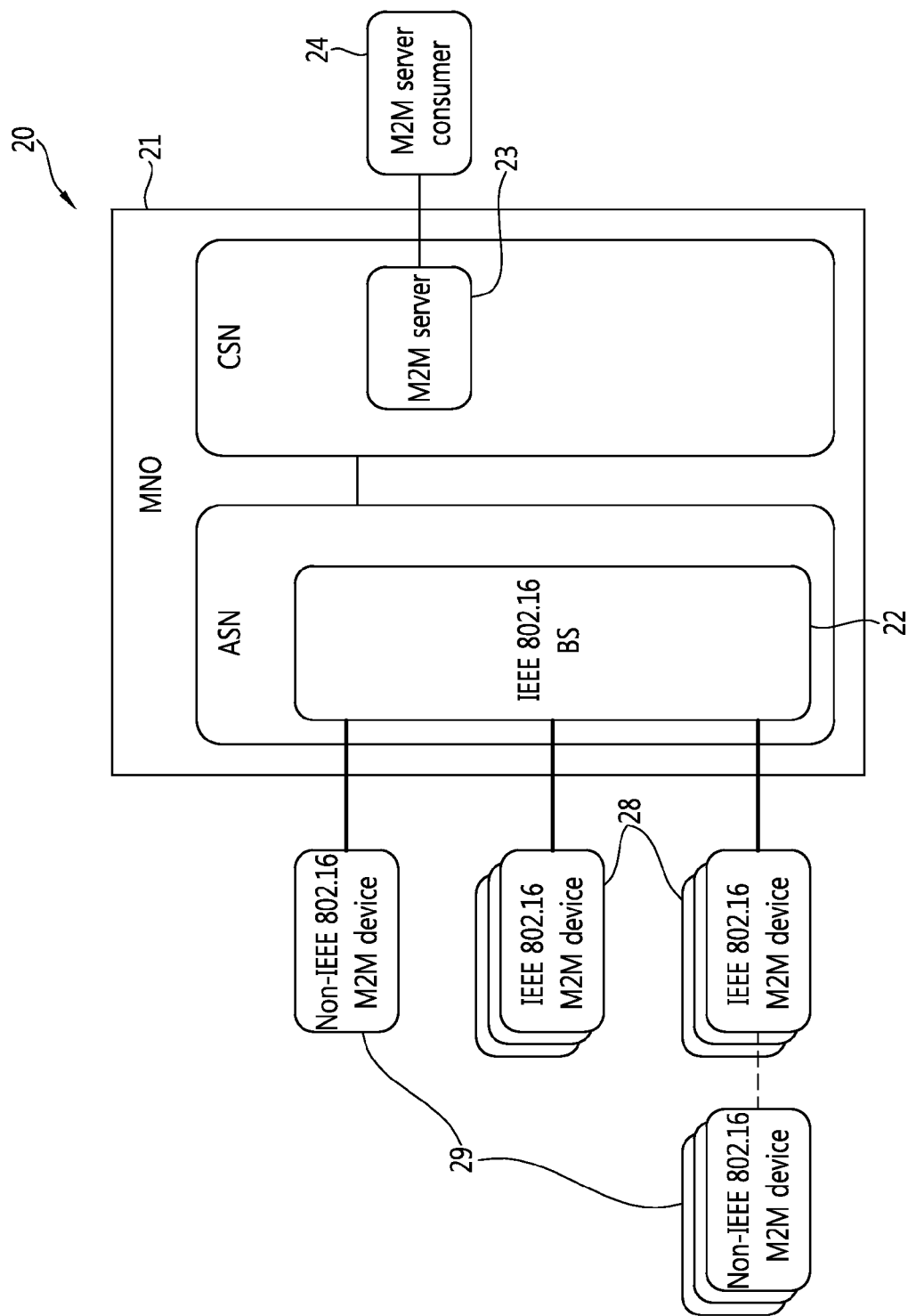
FIG. 2 shows basic machine-to-machine (M2M) service system architecture of IEEE 802.16 supporting M2M communication.

FIG. 2 shows basic machine-to-machine (M2M) service system architecture of IEEE 802.16 supporting M2M communication.

A basic M2M service system architecture 20 includes a mobile network operator (MNO) 21, a M2M service consumer 24, at least one IEEE 802.16 M2M device (hereinafter, 802.16 M2M device) 28, and at least one non-IEEE 802.16 M2M device 29. The MNO 21 includes an access service network (ASN) and a connectivity service network (CSN). The 802.16 M2M device 28 is an IEEE 802.16 mobile station (MS) having a M2M functionality. A M2M server 23 is an entity for communicating with one or more 802.16 M2M devices 28. The M2M server 23 has an interface accessibly by the M2M service consumer 24. The M2M service consumer 24 is a user of a M2M service. The M2M server 23 may be located inside or outside the CSN, and can provide a specific M2M service to the one or more 802.16 M2M devices 28. The ASN may include an IEEE 802.16 base station (BS) 22. A M2M application operates based on the 802.16 M2M device 28 and the M2M server 23.

The basic M2M service system architecture 20 supports two types of M2M communication, i.e., M2M communication between one or more 802.16 M2M devices and a M2M server or point-to-multipoint communication between the 802.16 M2M devices and an IEEE 802.16 BS. The basic M2M service system architecture of FIG. 2 allows the 802.16 M2M device to operate as an aggregation point for a non-IEEE 802.16 M2M device. The non-IEEE 802.16 M2M device uses a radio interface different from IEEE 802.16 such as IEEE 802.11, IEEE 802.15, PLC, or the like. In this case, the non-IEEE 802.16 M2M device is not allowed to change the radio interface to IEEE 802.16.

Figure 3:
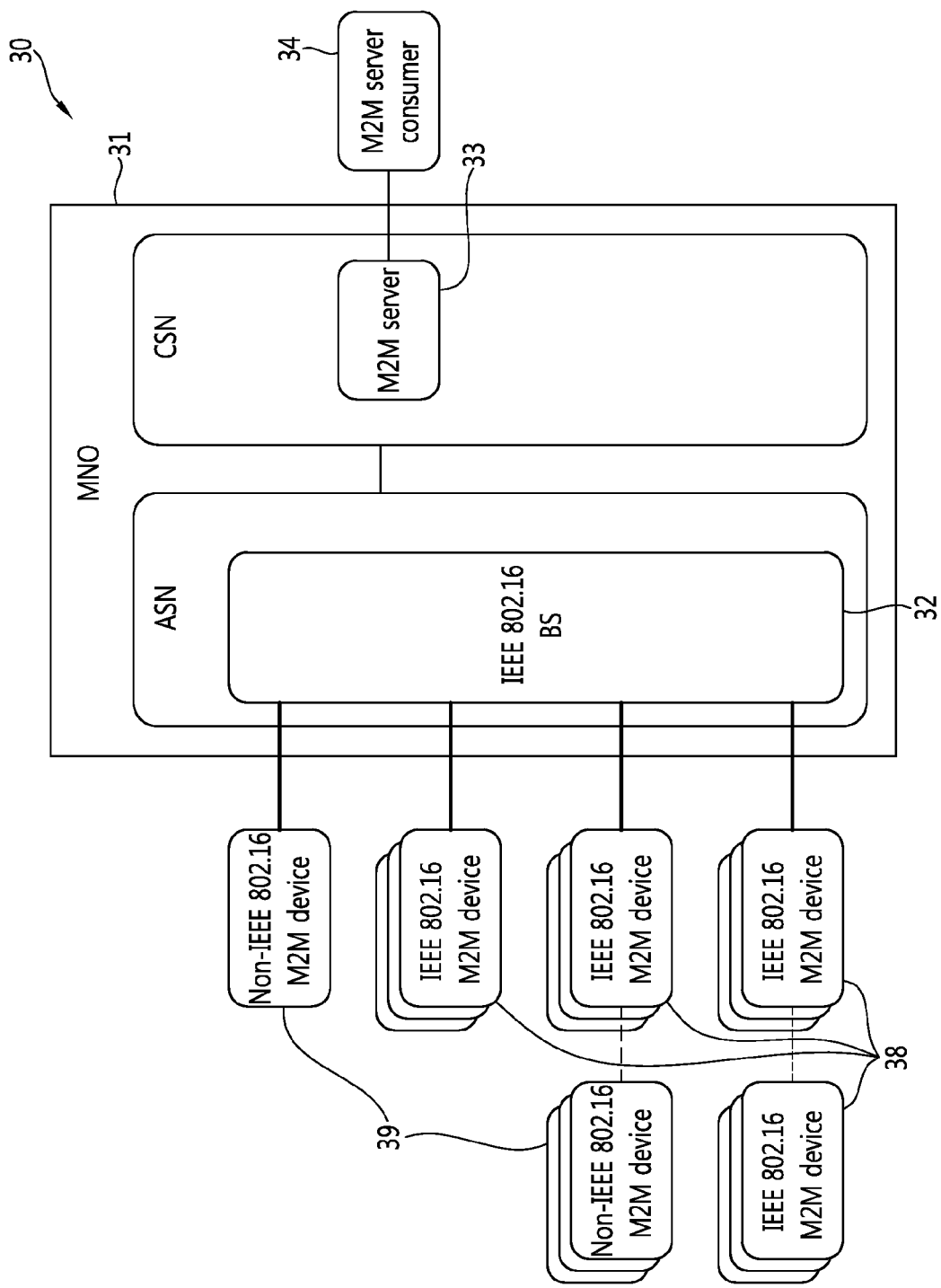
FIG. 3 shows advanced machine-to-machine (M2M) service system architecture of IEEE 802.16 supporting M2M communication.

FIG. 3 shows advanced machine-to-machine (M2M) service system architecture of IEEE 802.16 supporting M2M communication.

In the advanced M2M service system architecture, an 802.16 M2M device can operate as an aggregation point for a non-IEEE 802.16 M2M device, and also can operate as an aggregation point for an 802.16 M2M device. In this case, in order to perform an aggregation function for the 802.16 M2M device and the non-802.16 M2M device, the radio interface can be changed to IEEE 802.16. In addition, the advanced M2M service system architecture can support a peer-to-peer (P2P) connection between 802.16 M2M devices. In this case, the P2P connection can be established on either IEEE 802.16 or another radio interface such as IEEE 802.11, IEEE 802.15, PLC, or the like.

Hereinafter, IEEE 802.16e and IEEE 802.16m frame structures will be described.

Figure 4:
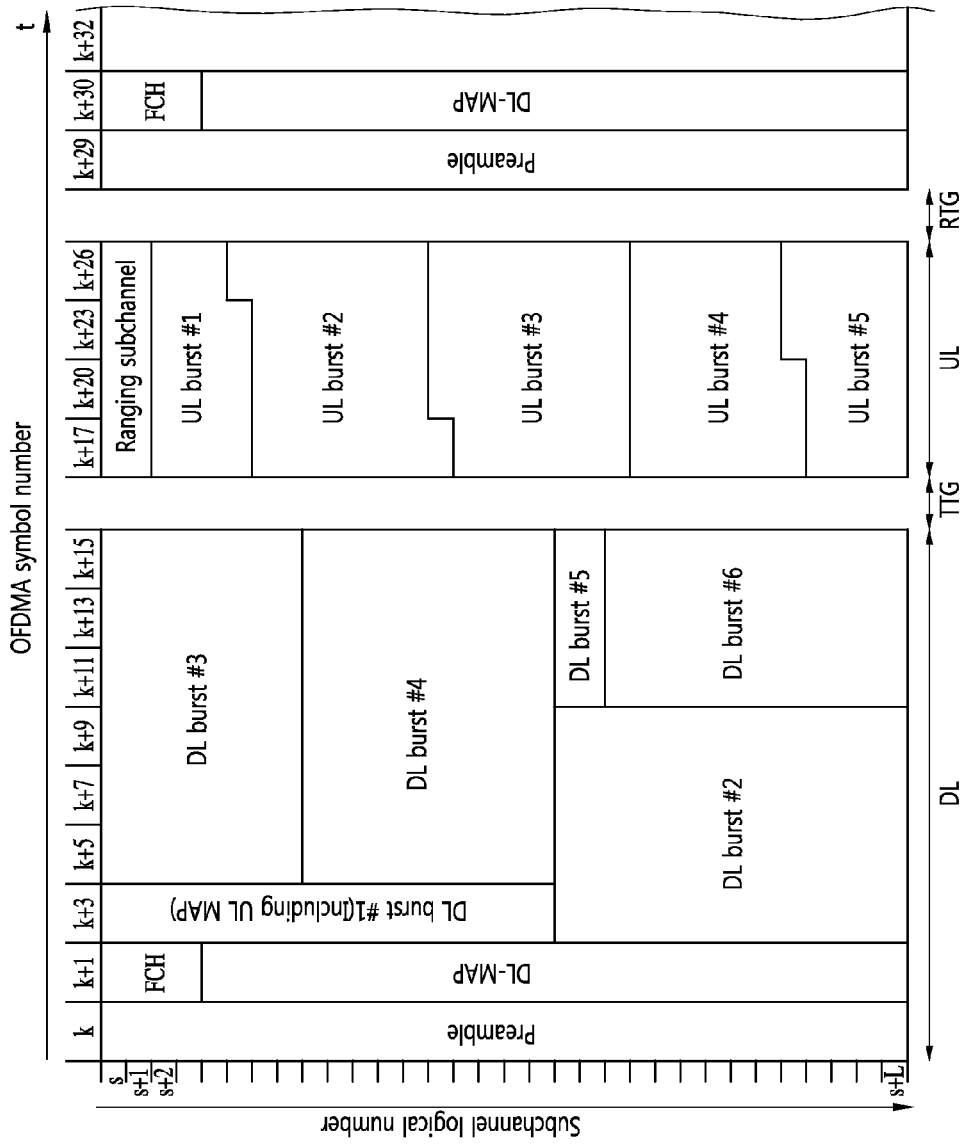
FIG. 4 shows an example of an IEEE 802.16e frame structure.

FIG. 4 shows an example of an IEEE 802.16e frame structure.

A time division duplex (TDD) frame structure of IEEE 802.16e is shown in FIG. 4. The TDD frame includes a downlink (DL) transmission period and an uplink (UL) transmission period. The DL transmission period temporally precedes the UL transmission period. The DL transmission period sequentially includes a preamble, a frame control header (FCH), a DL-MAP, a UL-MAP, and a DL burst region. The UL transmission period includes a ranging subchannel and a UL burst region. A guard time for identifying the UL transmission period and the DL transmission period is inserted to a middle portion (between the DL transmission period and the UL transmission period) and a last portion (next to the UL transmission period) of the frame. A transmit/receive transition gap (TTG) is a gap between a DL burst and a subsequent UL burst. A receive/transmit transition gap (RTG) is a gap between a UL burst and a subsequent DL burst.

A preamble is used between a BS and an MS for initial synchronization, cell search, and frequency-offset and channel estimation. The FCH includes information on a length of a DL-MAP message and a coding scheme of the DL-MAP. The DL-MAP is a region for transmitting the DL-MAP message. The DL-MAP message defines access to a DL channel. This implies that the DL-MAP message defines DL channel indication and/or control information. The DL-MAP message includes a configuration change count of a downlink channel descriptor (DCD) and a BS identifier (ID). The DCD describes a DL burst profile applied to a current MAP. The DL burst profile indicates characteristics of a DL physical channel. The DCD is periodically transmitted by the BS by using a DCD message. The UL-MAP is a region for transmitting a UL-MAP message. The UL-MAP message defines access to a UL channel. This implies that the UL-MAP message defines UL channel indication and/or control information. The UL-MAP message includes a configuration change count of an uplink channel descriptor (UCD) and also includes an effective start time of UL allocation defined by the UL-MAP. The UCD describes a UL burst profile. The UL burst profile indicates characteristics of a UL physical channel. The UCD is periodically transmitted by the BS by using a UCD message. The DL burst is a region for transmitting data sent by the BS to the MS. The UL burst is a region for transmitting data sent by the MS to the BS. The fast feedback region is included in a UL burst region of a frame. The fast feedback region is used to transmit information that requires a fast response from the BS. The fast feedback region can be used for CQI transmission. A location of the fast feedback region is determined by the UL-MAP. The location of the fast feedback region may be a fixed location in the frame, or may be a variable location.

Figure 5:
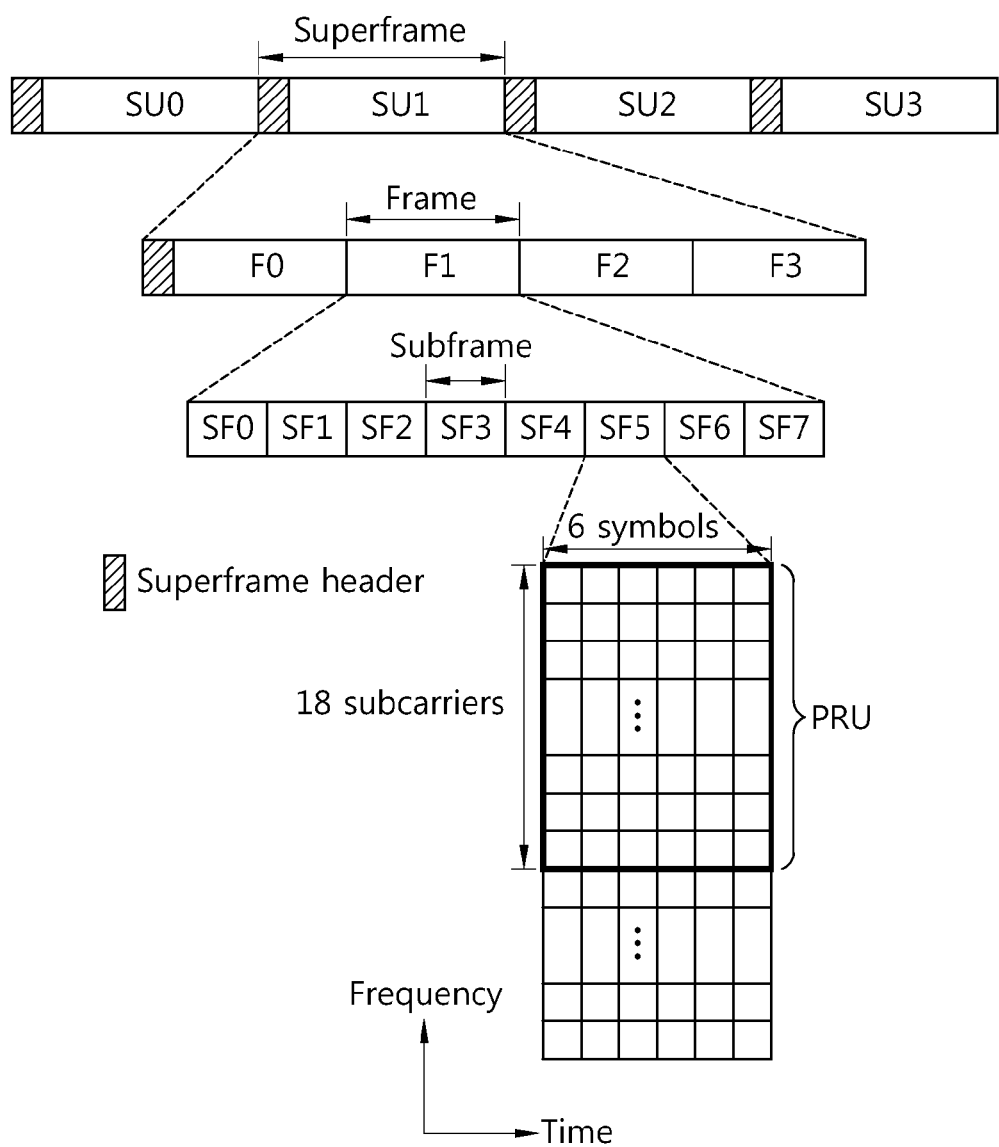
FIG. 5 shows an example of an IEEE 802.16m frame structure.

FIG. 5 shows an example of an IEEE 802.16m frame structure.

Referring to FIG. 5, a superframe (SF) includes a superframe header (SFH) and four frames F0, F1, F2, and F3. Each frame may have the same length in the SF. Although it is shown that each SF has a size of 20 milliseconds (ms) and each frame has a size of 5 ms, the present invention is not limited thereto. A length of the SF, the number of frames included in the SF, the number of SFs included in the frame, or the like may change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for UL or DL transmission. One subframe includes a plurality of orthogonal frequency division multiplexing (OFDM) symbols or orthogonal frequency division multiple access (OFDMA) symbols in a time domain, and includes a plurality of subcarriers in a frequency domain. An OFDM symbol is for representing one symbol period, and can be referred to as other terminologies such as an OFDMA symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) can be applied to the frame. In the TDD, each subframe is used in UL or DL transmission at the same frequency and at a different time. That is, subframes included in a TDD frame are divided into a UL subframe and a DL subframe in the time domain. In the FDD, each subframe is used in UL or DL transmission at the same time and at a different frequency. That is, subframes included in an FDD frame are divided into a UL subframe and a DL subframe in the frequency domain. UL transmission and DL transmission occupy different frequency bands and can be simultaneously performed.

A superframe header (SFH) can carry an essential system parameter and system configuration information. The SFH may be located in a first subframe in a superframe. The SFH may occupy last 5 OFDMA symbols of the first subframe. The SFH can be classified into a primary-SFH (P-SFH) and a secondary-SFH (S-SFH). The P-SFH may be transmitted in every superframe. Information transmitted on the S-SFH can be divided into 3 sub-packets, i.e., S-SFH SP1, S-SFH SP2, and S-SFH SP3. Each sub-packet can be transmitted periodically with a different periodicity. Information transmitted through the S-SFH SP1, the S-SFH SP2, and the S-SFH SP3 may be different from one another. The S-SFH SP1 may be transmitted with the shortest period, and the S-SFH SP3 may be transmitted with the longest period. The S-SFH SP1 includes information on network re-entry, and a transmission period of the S-SFH SP1 may be 40 ms. The S-SFH SP2 includes information on initial network entry and network discovery, and a transmission period of the S-SFH SP2 may be 80 ms. The S-SFH SP3 includes other important system information, and a transmission period of the S-SFH SP3 may be either 160 ms or 320 ms.

One OFDMA symbol includes a plurality of subcarriers, and the number of subcarriers is determined according to a fast Fourier transform (FFT) size. There are several types of subcarriers. A subcarrier type may include a data subcarrier for data transmission, a pilot subcarrier for various estimations, and a null carrier for a guard band and a DC carrier. A parameter for characterizing an OFDMA symbol includes BW, $N_{used}$, n, G, etc. BW denotes a nominal channel bandwidth. $N_{used}$ denotes the number of subcarriers in use (including a DC subcarrier). n denotes a sampling factor. This parameter is used to determine a subcarrier spacing and a useful symbol time together with BW and $N_{used}$. G denotes a ratio of a CP time and a useful time.

Table 1 below shows an OFDMA parameter. The OFDMA parameter of Table 1 can equally apply to the 802.163 frame structure of FIG. 4

In Table 1, $N_{FFT}$ is smallest power of two greater than $N_{used}$. A sampling factor $F_s$ is floor(n·BW/8000)×8000, a subcarrier spacing $\Delta f$ is $F_s/N_{FFT}$, a useful symbol time $T_b$ is $1/\Delta$, a CP time $T_g$ is $G \cdot T_b$, an OFDMA symbol time $T_s$ is $T_b+T_g$, and a sampling time is $T_b/N_{FFT}$.

Hereinafter, a paging message will be described.

The paging message is a media access control (MAC) message received from a base station (BS) in every paging cycle by a machine-to-machine (M2M) device operating in an idle mode. The paging message can indicate the presence of downlink (DL) traffic to be transmitted to a specific mobile station (MS). Alternatively, the paging message can indicate polling of the MS and requesting of a location update without a request on a network entry. The paging message can be broadcast.

Table 2 shows an example of a BS broadcast paging message (i.e., MOB_PAG-ADV message) which is a paging message of IEEE 802.16e.

TABLE 1

| Channel bandwidth, BW(MHz) | | | 5 | 7 | 8.75 | 10 | 20 |
|---|---|---|---|---|---|---|---|
| Sampling factor, n | | | 28/25 | 8/7 | 8/7 | 28/25 | 28/25 |
| Sampling frequency, $F_s$(MHz) | | | 5.6 | 8 | 10 | 11.2 | 22.4 |
| FFT size, $N_{FFT}$ | | | 512 | 1024 | 1024 | 1024 | 2048 |
| Subcarrier spacing, $\Delta f$(kHz) | | | 10.94 | 7.81 | 9.77 | 10.94 | 10.94 |
| Useful symbol time, $T_b$(μs) | | | 91.4 | 128 | 102.4 | 91.4 | 91.4 |
| G = 1/8 | Symbol time, $T_s$(μs) | | 102.857 | 144 | 115.2 | 102.857 | 102.857 |
| | FDD | Number of ODFMA symbols per 5 ms frame | 48 | 34 | 43 | 48 | 48 |
| | | Idle time(μs) | 62.857 | 104 | 46.40 | 62.857 | 62.857 |
| | TDD | Number of ODFMA symbols per 5 ms frame | 47 | 33 | 42 | 47 | 47 |
| | | TTG + RTG(μs) | 165.714 | 248 | 161.6 | 165.714 | 165.714 |
| G = 1/16 | Symbol time, $T_s$(μs) | | 97.143 | 136 | 108.8 | 97.143 | 97.143 |
| | FDD | Number of ODFMA symbols per 5 ms frame | 51 | 36 | 45 | 51 | 51 |
| | | Idle time(μs) | 45.71 | 104 | 104 | 45.71 | 45.71 |
| | TDD | Number of ODFMA symbols per 5 ms frame | 50 | 35 | 44 | 50 | 50 |
| | | TTG + RTG(μs) | 142.853 | 240 | 212.8 | 142.853 | 142.853 |
| G = 1/4 | Symbol time, $T_s$(μs) | | 114.286 | 160 | 128 | 114.286 | 114.286 |
| | FDD | Number of ODFMA symbols per 5 ms frame | 43 | 31 | 39 | 43 | 43 |
| | | Idle time(μs) | 85.694 | 40 | 8 | 85.694 | 85.694 |
| | TDD | Number of ODFMA symbols per 5 ms frame | 42 | 30 | 38 | 42 | 42 |
| | | TTG + RTG(μs) | 199.98 | 200 | 136 | 199.98 | 199.98 |
| Number of Guard subcarriers | Left | | 40 | 80 | 80 | 80 | 160 |
| | Right | | 39 | 79 | 79 | 79 | 159 |
| Number of used subcarriers | | | 433 | 865 | 865 | 865 | 1729 |
| Number of PRU in type-1 subframe | | | 24 | 48 | 48 | 48 | 96 |

TABLE 2

| Field | Size (bit) | Description |
|---|---|---|
| MOB_PAG-ADV_Message_format( ) { ... | — | |
| Num_Paging_Group_IDs | 8 | Number of paging group IDs in this message |
| Num_MACs | 8 | Number of MS MAC addresses |
| For (j=0;j<Num_MACs;j++){ | | |
| MS MAC Address hash | 24 | The hash is obtained by computing a CRC24 on the MS 48-bit MAC address. |
| Action Code | 2 | Paging action instruction to MS<br>0b00 = No action required<br>0b01 = Perform ranging to establish location and acknowledge message<br>0b10 = Enter network<br>0b11 = Reserved |
| ... | | |
| Reserved | 2 | |
| } ... } | | |

Referring to Table 2, when a value of an action code field of the MOB_PAG-ADV message is 0, the MOB_PAG-ADV message can indicate to the MS the presence of DL traffic to be transmitted. When the value of the action code field of the MOB_PAG-ADV message is 1, the MOB_PAG-ADV message can request the MS to perform a location update. In addition to the fields of Table 2, the MOB_PAG-ADV message can further include other fields.

Table 3 shows an example of a paging advertisement message (i.e., AAI-PAG-ADV message) which is a paging message of IEEE 802.16m.

TABLE 3

| Field | Size (bit) | Description | Requirement |
|---|---|---|---|
| ... | | | |
| Paging_Group_IDs bitmap | L | Indicate that the paging information for the corresponding paging group is included in AAI-PAG-ADV message. The length of Paging_Group_IDs bitmap is same as Num_PGIDs in PGID-Info message. | L equals the Num_PGIDs in PGID-Info message |
| For (i=0;i<M;i++) { | | | M equals the number of bits in Paging_Group_IDs bitmap whose bit is set to 1. |
| For (j=0;j<Num_AMSs;j++) { | | Num_AMSs indicates the number of paged AMSs in a corresponding paging group (1~32). | |
| Deregistration Identifier | 18 | Used to indicate Deregistration ID for the AMS to be paged (0~$2^{18}$ − 1). | Present if the S-SFH Network Configuration bit == 0b0. |
| MAC Address Hash | 24 | Used to identify the AMS to be paged. | Present if the S-SFH Network Configuration bit == 0b1. |
| Paging Cycle | 4 | Used to indicate Paging cycle for the AMS to be paged.<br>0x00: 4 superframes<br>0x01: 8 superframes<br>0x02: 16 superframes<br>0x03: 32 superframes<br>0x04: 64 superframes<br>0x05: 128 superframes<br>0x06: 256 superframes<br>0x07: 512 superframes<br>0x08-0x15: Reserved | Present if the S-SFH Network Configuration bit == 0b0. |
| Action code | 1 | Used to indicate the purpose of the AAI-PAG-ADV message.<br>0b0: perform network reentry<br>0b1: perform ranging for location update | |
| ... } ... } ... | | | |

Referring to Table 3, when a value of an action code field of the AAI-PAG-ADV message is 0, the AAI-PAG-ADV message can instruct the MS to perform network re-entry. When the value of the action code field of the AAI-PAG-ADV message is 1, the AAI-PAG-ADV message can instruct the MS to perform ranging for the location update. In addition to the fields of Table 3, the AAI-PAG-ADV message may further include other fields.

The MS can transmit a deregistration request message to the BS. The MS can report to the BS a deregistration request of a normal operation service provided from the BS through the deregistration request message. A deregistration request message of IEEE 802.16e may be a DREG-REQ message. A deregistration request message of IEEE 802.16m may be an AAI-DREQ-REQ message.

The BS can transmit a deregistration response message to the MS in response to the deregistration request message. Alternatively, the deregistration response message may be transmitted alone without the deregistration request message. The deregistration response message may indicate a change of an access state of the MS. The MS receives the deregistration response message, and takes an action indicated in an action code. A deregistration response message of IEEE 802.16e may be a DREG-CMD message. A deregistration response message of IEEE 802.16m may be an AAI-DREQ-RSP message.

Table 4 shows an example of a message format of the DREG-CMD message of IEEE 802.16e.

TABLE 4

| Field | Size | Description |
|---|---|---|
| DREG-CMD_Message_Format ( ) { | | — |
|   Action Code | 8 | — |
|   TLV encoded parameters | variable | — |
| } | | — |

Table 5 shows an example of DREG-CMD/REQ message encoding of IEEE 802.16e. The TLV encoded parameters field of Table 4 can be encoded as shown in Table 5.

TABLE 5

| Name | Type | Length | Value | Scope |
|---|---|---|---|---|
| REQ-duration | 2 | 1 | Waiting value for the DREG-REQ message retransmission (measured in frames) if this is included with action code 0x06 in DREG-CMD. If serving BS includes REQ-duration in a DREG-CMD message including an Action Code = 0x05, the MS may initiate an Idle Mode request through a DREG-REQ with Action Code = 0x01, request for MS De-Registration from serving BS and initiation of MS Idle Mode, at REQ-duration expiration. | DREG-CMD |
| Idle Mode Retain Information | 4 | 1 | Provided as part of this message indicative only. Network reentry from idle mode process requirements may change at time of actual reentry. For each bit location, a value of 0 indicates the information for the associated reentry management messages shall not be retained and managed; a value of 1 indicates the information for the associated reentry management message shall be retained and managed. | DREG-CMD DREG-REQ |
| Paging Cycle Request | 52 | 2 | Requested cycle in which the paging message is transmitted within the paging group. | DREG-REQ |

Table 6 shows an example of a message format of the AAI-DREG-RSP message of IEEE 802.16m.

TABLE 6

| Field | Size (bits) | Description | Requirement |
|---|---|---|---|
| ... | | | |
| Action code | 4 | Used to indicate the purpose of this message.<br>0x05: AMS shall begin idle mode initiation: a) to signal AMS to begin idle mode in unsolicited manner or b) to allow AMS to transmit AMS-initiated idle mode request at the REQ-Duration expiration<br>0x06: This option is valid only in response to a AAI-DREG-REQ message with Deregistration Code 0x01: a) to reject AMS-initiated idle mode request or b) to allow AMS to transmit AMS-initiated idle mode request at the REQ-Duration expiration<br>0x07: This option is valid in response to a AAI-DREG-REQ message with Deregistration-request-code = 0x01 to allow AMS-initiated idle mode request. | |

TABLE 6-continued

| Field | Size (bits) | Description | Requirement |
|---|---|---|---|
| If (Action code=0x05) {<br>...<br>}<br>If (Action code=0x06) {<br>...<br>}<br>If (Action code=0x07) {<br>...<br>}<br>... | | | |

The paging message can be transmitted not only to a normal MS but also to an M2M device. That is, the MOV_PAG-ADV message of Table 2 can be transmitted to an M2M device operating in an IEEE 802.16e system, and the AAI-PAG-ADV message of Table 3 can be transmitted to an M2M device operating in an IEEE 802.16m system. Meanwhile, most M2M devices are supposed to transmit non-realtime periodic uplink (UL) data at a fixed location according to an M2M application. Accordingly, the paging message can be used to trigger the non-realtime periodic UL data transmission of the fixed M2M device.

Hereinafter, the proposed UL data transmission method will be described. The present invention proposes a method of triggering UL data transmission of an M2M device by using a paging message.

According to the proposed UL data transmission method, the paging message can additionally include a field for triggering UL data transmission of the M2M device. Regarding an M2M device operating in an IEEE 802.16e system, Table 7 shows an example of MOB_PAG-ADV message including the field for triggering UL data transmission of the M2M device.

Referring to Table 7, when the MOB-PAG-ADV message is used for polling of non-realtime periodic UL data transmission for the fixed M2M device, an M2M report code field can be newly added in the MOB_PAG-ADV message. If a value of the M2M report code field is 1, the BS can instruct the M2M device to transmit UL data. In addition to the fields of Table 7, the MOB_PAG-ADV message can further include other fields.

Regarding an M2M device operating in an IEEE 802.16m system, Table 8 shows an example of AAI-PAG-ADV including a field for triggering UL data transmission of the M2M device

TABLE 7

| Field | Size (bit) | Description |
|---|---|---|
| MOB_PAG-ADV_Message_format( ) {<br>... | — | |
|   Num_MACs | 8 | Number of MS MAC addresses |
|   For (j=0;j<Num_MACs;j++){ | | |
|     MS MAC Address hash | 24 | The hash is obtained by computing a CRC24 on the MS 48-bit MAC address. |
|     Action Code | 2 | Paging action instruction to MS<br>0b00 = No action required<br>0b01 = Perform ranging to establish location and acknowledge message<br>0b10 = Enter network<br>0b11 = Reserved |
|     M2M report code | 1 | Action instruction to M2m device.<br>1: indication for the M2M device to send the uplink report |
|     Reserved | 5 | |
|   }<br>...<br>} | | |

TABLE 8

| Field | Size (bit) | Description | Requirement |
|---|---|---|---|
| ... | | | |
| For (j=0;j<Num__AMSs;j++) { | | Num__AMSs indicates the number of paged AMSs in a corresponding paging group (1~32). | |
| Deregistration Identifier | 18 | Used to indicate Deregistration ID for the AMS to be paged (0~$2^{18}$ − 1). | Present if the S-SFH Network Configuration bit == 0b0. |
| MAC Address Hash | 24 | Used to identify the AMS to be paged. | Present if the S-SFH Network Configuration bit == 0b1. |
| Paging Cycle | 4 | Used to indicate Paging cycle for the AMS to be paged. 0x00: 4 superframes 0x01: 8 superframes 0x02: 16 superframes 0x03: 32 superframes 0x04: 64 superframes 0x05: 128 superframes 0x06: 256 superframes 0x07: 512 superframes 0x08-0x15: Reserved | Present if the S-SFH Network Configuration bit == 0b0. |
| Action code | 1 | Used to indicate the purpose of the AAI-PAG-ADV message. 0b0: perform network reentry 0b1: perform ranging for location update | |
| M2M Report code | 1 | Indication for the M2M device to send the uplink report. 0b0: Reserved 0b1: Send uplink report | Present if M2M is supported. |
| ... | | | |
| } | | | |
| ... | | | |

Although a case where the MOB_PAG-ADV message or the AAI-PAG-ADV message is used to trigger UL data transmission has been described above, the present invention is not limited thereto. In addition, the field for triggering UL data transmission of the M2M device can be newly added as described above, or can use the existing action code field.

Meanwhile, a paging cycle of the existing paging message that indicates to the MS the presence of DL traffic to be transmitted may be equal to or different from a paging cycle of a paging message that triggers UL data transmission of the M2M device proposed in the present invention. If the paging cycles of the two paging messages are different from each other, the M2M device needs to negotiate a paging cycle of each paging message when entering the idle mode. It is assumed hereinafter that the M2M device has one paging cycle irrespective of the purpose of the paging message.

Figure 6:
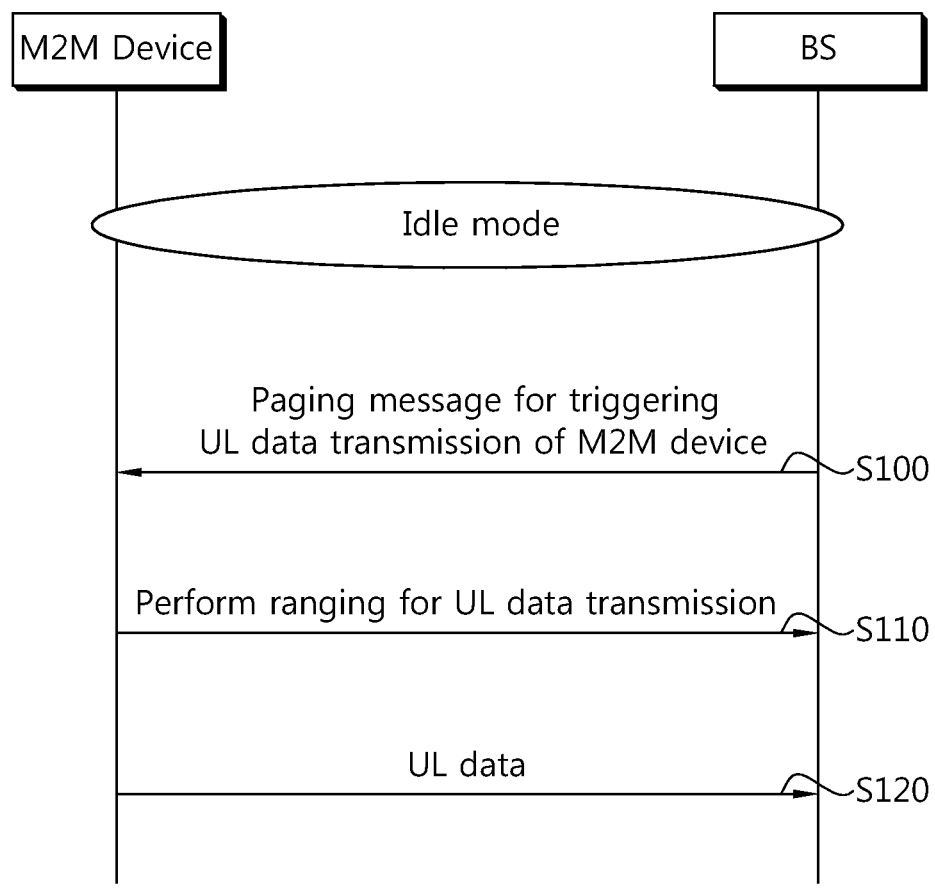
FIG. 6 shows an embodiment of the proposed UL data transmission method.

FIG. 6 shows an embodiment of the proposed UL data transmission method.

In step S100, a BS transmits a paging message to an M2M device in an idle mode. In this case, the paging message triggers UL data transmission of the M2M device. When the M2M device is an M2M device operating in an IEEE 802.16e system, the paging message may be the MOB_PAG-ADV message of Table 7. When the M2M device is an M2M device operating in an IEEE 802.16m system, the paging message may be the AAI-PAG-ADV message of Table 8. That is, a field for triggering UL data transmission of the M2M device can be added in the paging message.

In step S110, the M2M device performs ranging on the BS to transmit UL data. In step S120, the M2M device transmits the UL data to the BS.

Figure 7:
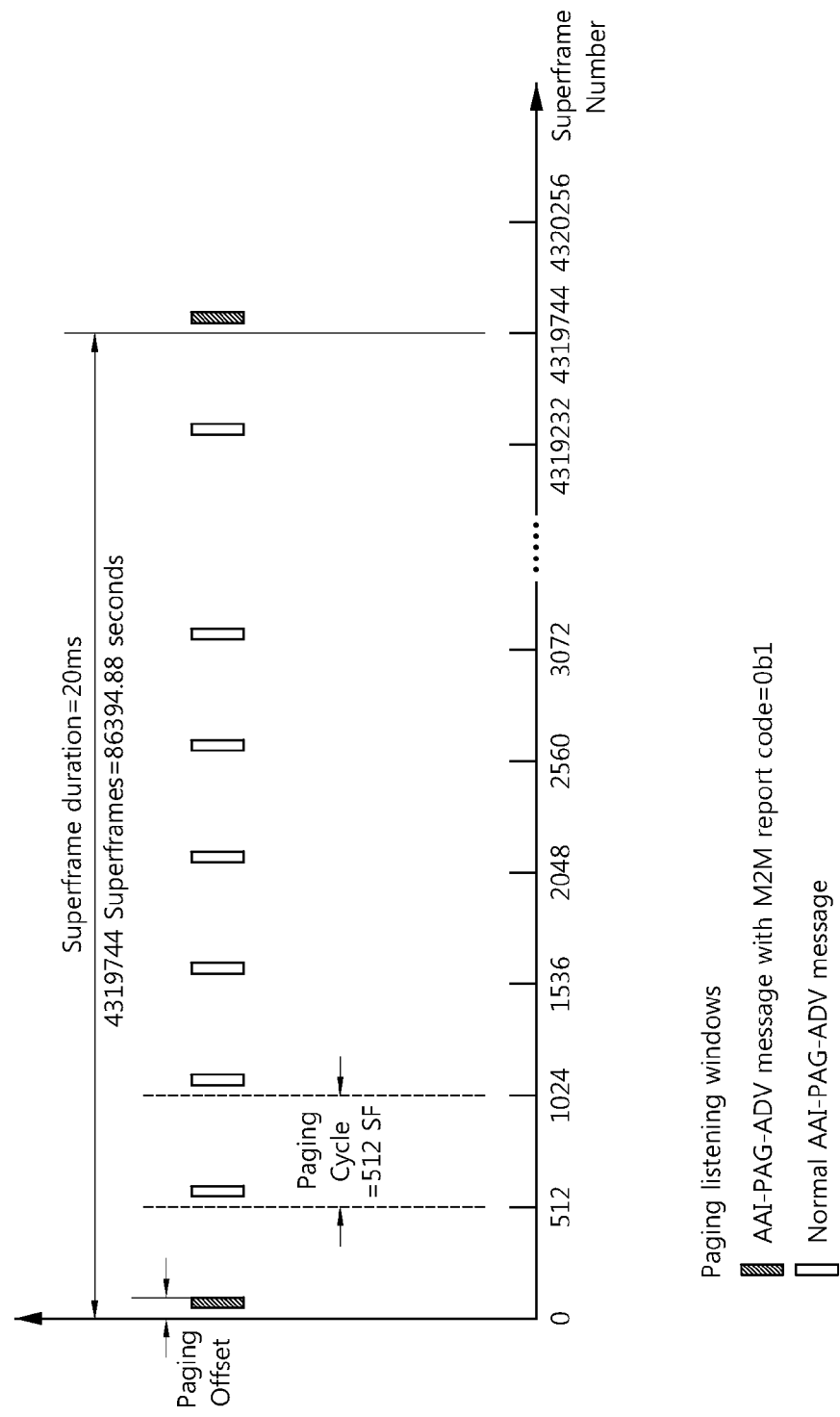
FIG. 7 shows an example of a paging listening window according to the proposed UL data transmission method.

FIG. 7 shows an example of a paging listening window according to the proposed UL data transmission method.

A smart meter for transmitting UL data in every 24 hours is shown in FIG. 7. A superframe length is 20 milliseconds (ms), and a paging cycle is 512 SF=10.24 seconds. Therefore, the smart meter wakes up in every 10.24 seconds to receive an AAI-PAG-ADV message transmitted from a BS. In addition, 8437 paging cycles=4319744 superframes=86394.88 seconds=about 24 hours. Therefore, the BS transmits an AAI-PAG-ADV message for triggering UL data transmission in every 8437 paging cycles. As shown in Table 8, an M2M report code field in the AAI-PAG-ADV message may be 1. The smart meter can periodically transmit UL data to the BS in every 24 hours according to the AAI-PAG-ADV message for triggering transmission of UL data transmitted in every 8437 paging cycles.

Figure 8:
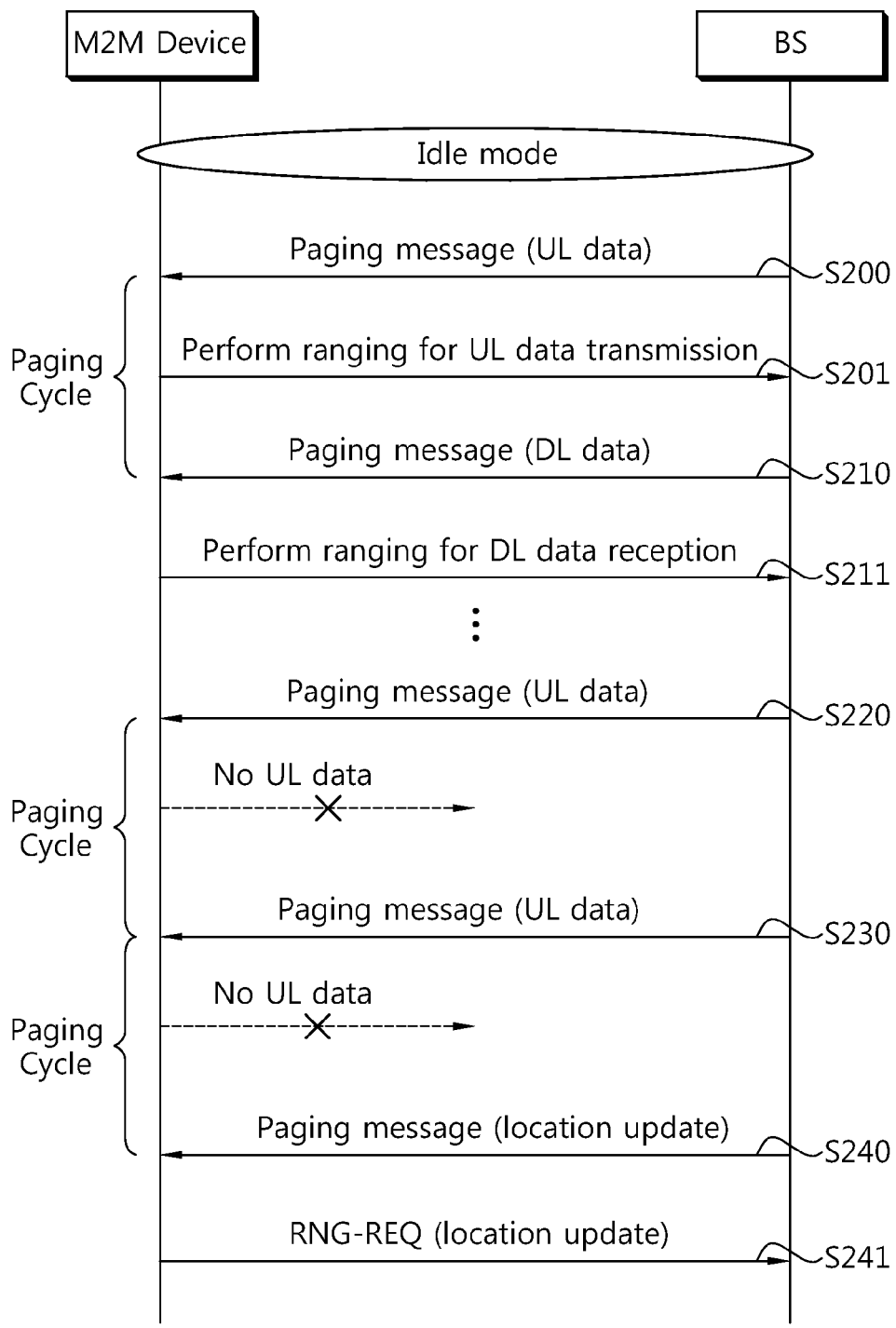
FIG. 8 shows another embodiment of the proposed UL data transmission method.

FIG. 8 shows another embodiment of the proposed UL data transmission method.

Even though a BS transmits to an M2M device a paging message for triggering UL data transmission, there may be no data to be transmitted by the M2M device to the BS. In this case, the M2M device may take no action after receiving the message. Accordingly, the M2M device may do not perform ranging on the BS, and may reduce an unnecessary ranging attempt. However, when the M2M device does not transmit UL data, the BS may not be able to distinguish whether the UL data is not transmitted because the M2M device fails to receive the paging message or the UL data is not transmitted because there is no UL data to be transmitted. Therefore, the BS transmits N times the paging message for triggering UL data transmission, and if there is no response for this from the M2M device, can instruct the M2M device to perform a location update. This is to check the presence and location of the M2M device.

Referring to FIG. 8, in step S200, the BS transmits to the M2M device a paging message for triggering UL data transmission. In step S201, the M2M device performs ranging on the BS to transmit UL data. In a next paging cycle, i.e., in step S210, the BS transmits a paging message for DL data transmission to the M2M device. In step S211, the M2M device performs ranging on the BS to receive DL data.

In step S220, the BS transmits to the M2M device a paging message for triggering UL data transmission. However, the M2M device does not perform ranging on the BS since there is no UL data to be transmitted. In a next paging cycle, i.e., in step S230, the BS retransmits a paging message for triggering UL data transmission to the M2M device. However, the M2M device does not perform ranging on the BS since there is no UL data to be transmitted. If it is assumed that N=2, the BS transmits a paging message for a location update to the M2M device in a next paging cycle, i.e., S240. An action code of the paging message for the location update may be a location update. In step S241, the M2M device transmits to the BS a ranging request message (RNG-REQ message) for the location update.

Figure 9:
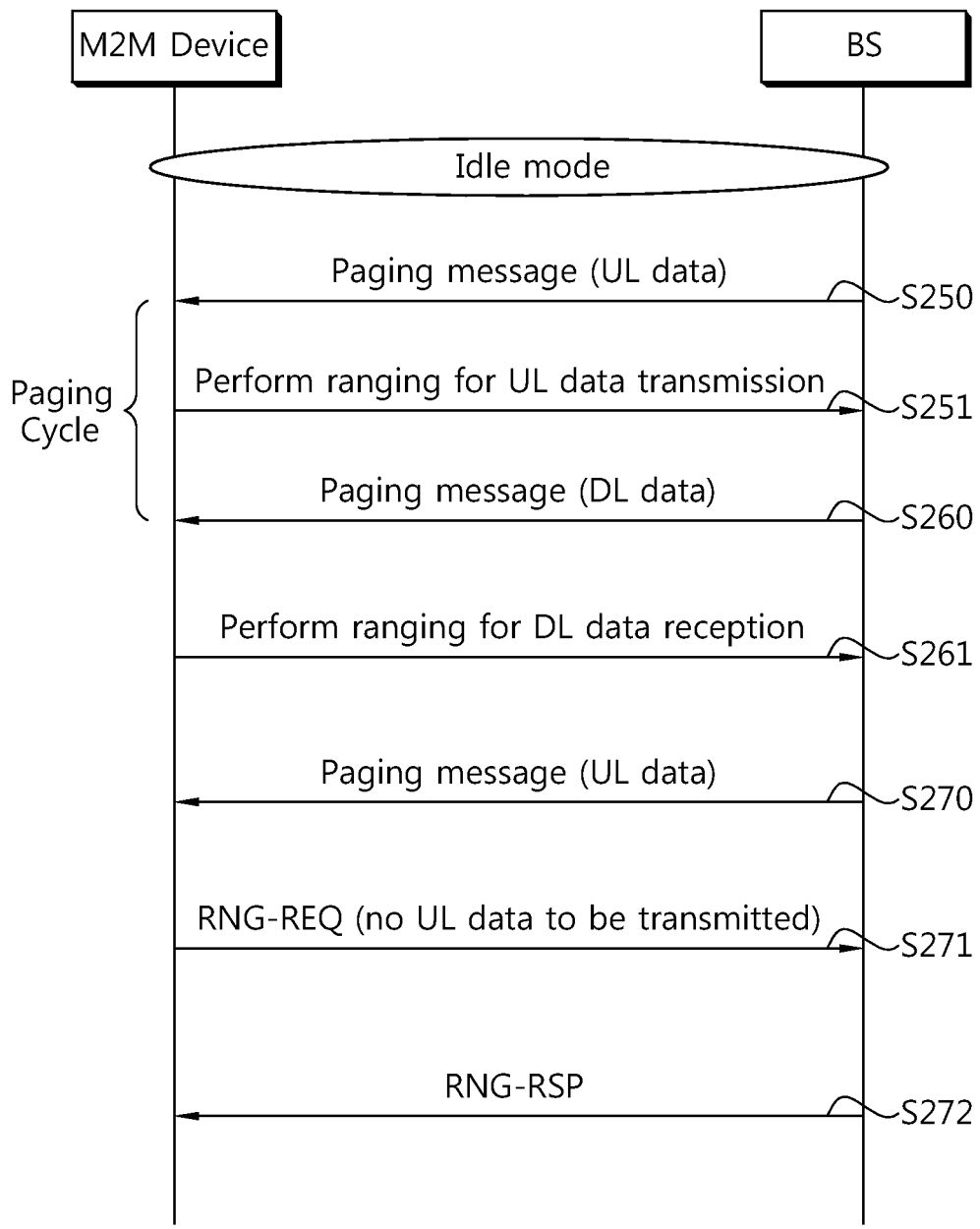
FIG. 9 shows another embodiment of the proposed UL data transmission method.

FIG. 9 shows another embodiment of the proposed UL data transmission method.

Even though a BS transmits to an M2M device a paging message for triggering UL data transmission, if there is no UL data to be transmitted by the M2M device to the BS, the M2M device can report to the BS the absence of the UL data by using a location update. In this case, the M2M device transmits an RNG-REQ message to the BS even though there is no UL data to be transmitted. The purpose of the RNG-REQ message may be the location update. Unnecessary ranging is attempted even though there is no UL data to be transmitted. However, the BS can clearly recognize the absence of the UL data to be transmitted, and the M2M device can report the absence of the UL data to the BS without having to perform a network entry.

Referring to FIG. 9, in step S250, the BS transmits to the M2M device a paging message for triggering UL data transmission. In step S251, the M2M device performs ranging on the BS to transmit UL data. In a next paging cycle, i.e., in step S260, the BS transmits a paging message for DL data transmission to the M2M device. In step S261, the M2M device performs ranging on the BS to receive DL data.

In step S270, the BS transmits to the M2M device a paging message for triggering UL data transmission. However, since there is no UL data to be transmitted in step S271, the M2M device transmits to the BS an RNG-REQ message for indicating the absence of UL data to be transmitted. The purpose of the RNG-REQ message may be a location update. In step S272, the BS transmits an RNG-RSP message to the M2M device in response to the RNG-REQ message.

Meanwhile, an access control for the M2M device can be performed by using the paging message for triggering UL data transmission proposed in the present invention. Hereinafter, an access control method using the paging message will be described. The access control method proposed in the present invention can be classified into a method for controlling an access of the M2M device by not transmitting the paging message and a method for controlling an access of the M2M device by reporting whether UL data can be transmitted by using the paging message.

1) First, the method of controlling the access of the M2M device by not transmitting the paging message will be described. Hereinafter, when it is said that the paging message is not transmitted, it may imply that the paging message itself is not transmitted or may imply that the paging message is transmitted but an identifier of the M2M device is not included in the paging message.

Figure 10:
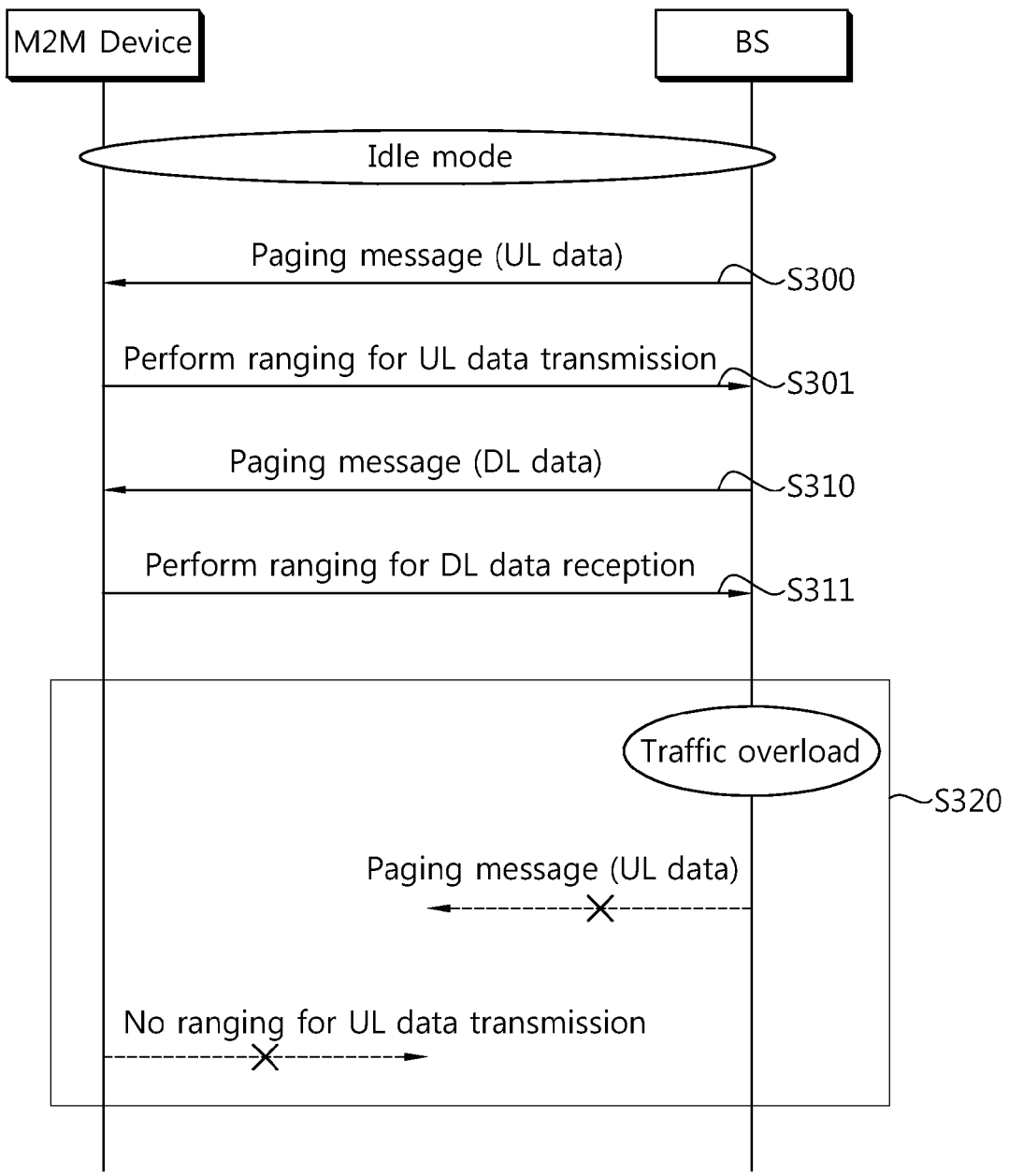
FIG. 10 shows another embodiment of the proposed UL data transmission method.

FIG. 10 shows another embodiment of the proposed UL data transmission method.

A BS may not transmit a paging message to an M2M device in a specific paging cycle due to a network overload. The M2M device expects to receive the paging message in every paging cycle. However, if the M2M fails to receive the paging message for triggering UL data transmission, the M2M cannot transmit UL data to the BS. Accordingly, the BS can control an access for a specific M2M device. Meanwhile, in this case, it is not that all M2M devices fail to receive the paging message for triggering UL data transmission but that a specific M2M device may receive the paging message and another specific M2M device may not be able to receive the paging message.

Referring to FIG. 10, in step S300, the BS transmits the paging message for triggering UL data transmission to the M2M device. In step S301, the M2M device performs ranging on the BS to transmit UL data. In a next paging cycle, i.e., step S310, the BS transmits to the M2M device a paging message for DL data transmission. In step S311, the M2M device performs ranging on the BS to receive DL data.

In step S320, a traffic overload occurs. Accordingly, the BS does not transmit to the M2M device the paging message for triggering UL data transmission. Since the M2M device fails to receive the paging message, ranging for UL data transmission is not performed. Accordingly, an access control for the M2M device is achieved.

Figure 11:
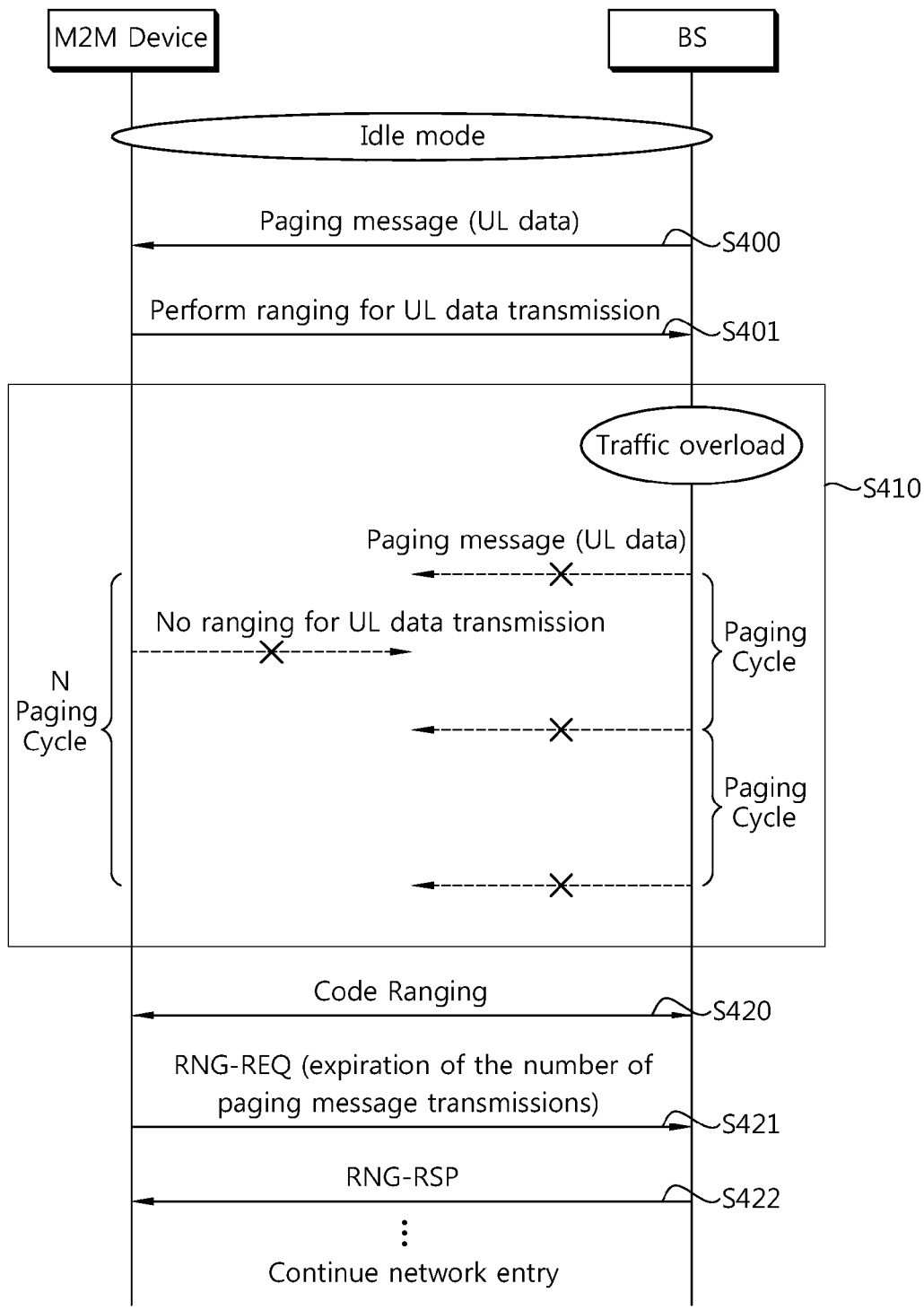
FIG. 11 shows another embodiment of the proposed UL data transmission method.

FIG. 11 shows another embodiment of the proposed UL data transmission method.

A BS may not transmit to an M2M device a paging message for triggering UL data transmission in a specific paging cycle due to a network overload. In this case, the M2M device may expect to receive the paging message for triggering UL data transmission in a next paging cycle and may postpone transmission of UL data. However, if the BS continues to not transmit the paging message for triggering UL data transmission, UL data to be transmitted by the M2M device is outdated, and ranging for transmitting UL data cannot be performed. Therefore, in a situation where the M2M device cannot receive the paging message from the BS and thus cannot satisfy a quality of service (QoS), the M2M device may attempt ranging on the BS to transmit UL data. The M2M device may attempt ranging on the BS when the M2M device fails to receive the paging message during up to N paging cycles. For example, N may be 3.

When the M2M device transmits an RNG-REQ message to the BS, it can be reported that the purpose of ranging is the expiration of the maximum number of transmissions of the paging message. The BS can recognize this and can allow a network entry process of the M2M device. The maximum number of transmissions of the paging message can equally apply to all M2M devices. In this case, the maximum number of transmissions of the paging message can be defined by a system parameter. Alternatively, the maximum number of transmissions of the paging message may be different for each M2M device according to a service class. In this case, the maximum number of transmissions of the paging message may be negotiated to one of capability values or can be defined during a DSx process.

In this case, the M2M device can be configured such that UL data is transmitted only after receiving a message for triggering UL data transmission from the BS. The BS can control an overall network load by controlling the presence/absence of UL data transmission according to the load. In addition, in this case, UL data of the M2M device has a delay tolerable characteristic in general, and thus UL data transmission of the M2M device has no significant problem. The M2M device can negotiate such a characteristic of the M2M device with the BS during a registration process or when entering an idle mode. Alternatively, the M2M device can negotiate the characteristic of the M2M device with the BS in every service flow through the DSx process.

Referring to FIG. 11, in step S400, the BS transmits to the M2M device a paging message for triggering UL data transmission. In step S401, the M2M device performs ranging on the BS to transmit UL data.

In step S410, a traffic overload occurs. Accordingly, the BS does not transmit to the M2M device the paging message for triggering UL data transmission. Since the M2M device fails to receive the paging message, ranging for UL data transmission is not performed. The BS does not transmit the paging message to the M2M device during N paging cycles, and thus the M2M device cannot receive the paging message during the N paging cycles.

When the M2M device fails to receive the paging message during N paging cycles corresponding to the maximum number of transmissions of the paging message, the M2M device attempts code raging in step S420. In step S421, the M2M device transmits an RNG-REQ message to the BS. In this case, the RNG-REQ message can indicate the expiration of the maximum number of transmissions of the paging message. In step S422, the BS can transmit an RNG-RSP message to the M2M device in response to the RNG-REQ message. Accordingly, the M2M device can continue to perform the network entry process on the BS.

The maximum number of transmissions of the paging message can be included in a deregistration response message. For example, the maximum number of transmissions of the paging message may be included in a DREG-CMD message which is a deregistration response message of IEEE 802.16e. Alternatively, the maximum number of transmissions of the paging message may be included in an AAI-DREG-RSP message which is a deregistration response message of IEEE 802.16m. Table 9 shows an example of a DREG-CMD message including a field for indicating the maximum number of transmissions of a paging message.

TABLE 9

| Name | Type | Length | Value | Scope |
| --- | --- | --- | --- | --- |
| M2M device specific Idle mode timer | 53 | 3 | When the M2M device is in the idle mode, it indicates a maximum interval length during the location update. | DREG-CMD |
| Transmission Type | 54 | 1 | Bit 0: a transmission type indicator of UL data transmission. If its value is 0b01, it is allowed to transmit UL data only after receiving a paging message having an M2M report code. Bit 1-7: reserved | DREG-CMD |
| Max number of paging cycle | 55 | 8 | It indicates a maximum number of paging cycles by which the M2M device waits for the MOB_PAG-ADV message having the M2M report code. It is indicated in a unit of paging cycles. | DREG-CMD |

Referring to Table 9, when the BS controls an access of the M2M device by using the paging message, the Transmission Type field and the Max number of paging cycle field can be newly added to the DREG-CMD message. The M2M device can receive a DREG-CMD message including the Max number of paging cycle field and the Transmission Type field in which the M2M device is set to 1. In this case, the M2M device may wait for an MOB_PAG-ADV message (i.e., a paging message having an M2M report code) for triggering UL data transmission during a period corresponding to (Max number of paging cycle×paging cycle) before transmitting UL data. If the M2M device fails to receive the MOB_PAG-ADV message for triggering at least one UL data transmission during the period corresponding to (Max number of paging cycle×paging cycle), the M2M device can transmit the UL data to the BS without having to receive the MOB_PAG-ADV message.

Table 10 shows an example of an AAI-DREG-RSP message including a field indicating a maximum number of transmissions of a paging message.

TABLE 10

| Field | Size (bits) | Description | Requirement |
| --- | --- | --- | --- |
| ... | | | |
| Action code | 4 | Used to indicate the purpose of this message. 0x05: AMS shall begin idle mode initiation: a) to signal AMS to begin idle mode in unsolicited manner or b) to allow | |

TABLE 10-continued

| Field | Size (bits) | Description | Requirement |
|---|---|---|---|
| | | AMS to transmit AMS-initiated idle mode request at the REQ-Duration expiration. 0x06: This option is valid only in response to a AAI-DREG-REQ message with Deregistration_Request_Code 0x01: a) to reject AMS-initiated idle mode request or b) to allow AMS to transmit AMS-initiated idle mode request at the REQ-Duration expiration. 0x07: This option is valid in response to a AAI-DREG-REQ message with Deregistration_Request_Code = 0x01 to allow AMS-initiated idle mode request. | |
| If (Action code=0x05) { ... } | | | |
| If (Action code=0x06) { ... } | | | |
| If (Action code=0x07) { M2M device-specific Idle mode timer | 24 | Length in seconds of the maximum interval between two consecutive location updates while the M2M device is in idle mode. | May present when the M2M device enters idle mode. |
| Transmission Type | 1 | 0: Reserved 1: Allowed to send data only after receiving paging message with M2M report code 0b1. | Present if needed. |
| Max number of paging cycle } ... | 16 | This is for M2M device to wait for AAI-PAG-ADV with M2M report code 0b1. The unit is the duration of the paging cycle. | Present if Transmission Type is set to 1. |

Referring to Table 10, when the BS controls an access of the M2M device by using the paging message, the Transmission Type field and the Max number of paging cycle field can be newly added to the AAI-DREG-RSP message. A transmission period of UL data is equal to or greater than a paging cycle. The M2M device can receive a AAI-DREG-RSP message including the Max number of paging cycle field and the Transmission Type field set to 1. In this case, the M2M device may wait for an AAI-PAG-ADV message (i.e., a paging message having an M2M report code=0b1) for triggering UL data transmission during a period corresponding to (Max number of paging cycle×paging cycle) before transmitting UL data. If the M2M device fails to receive the AAI-PAG-ADV message for triggering at least one UL data transmission during the period corresponding to (Max number of paging cycle×paging cycle), the M2M device can transmit the UL data to the BS without having to receive the AAI-PAG-ADV message.

Figure 12:
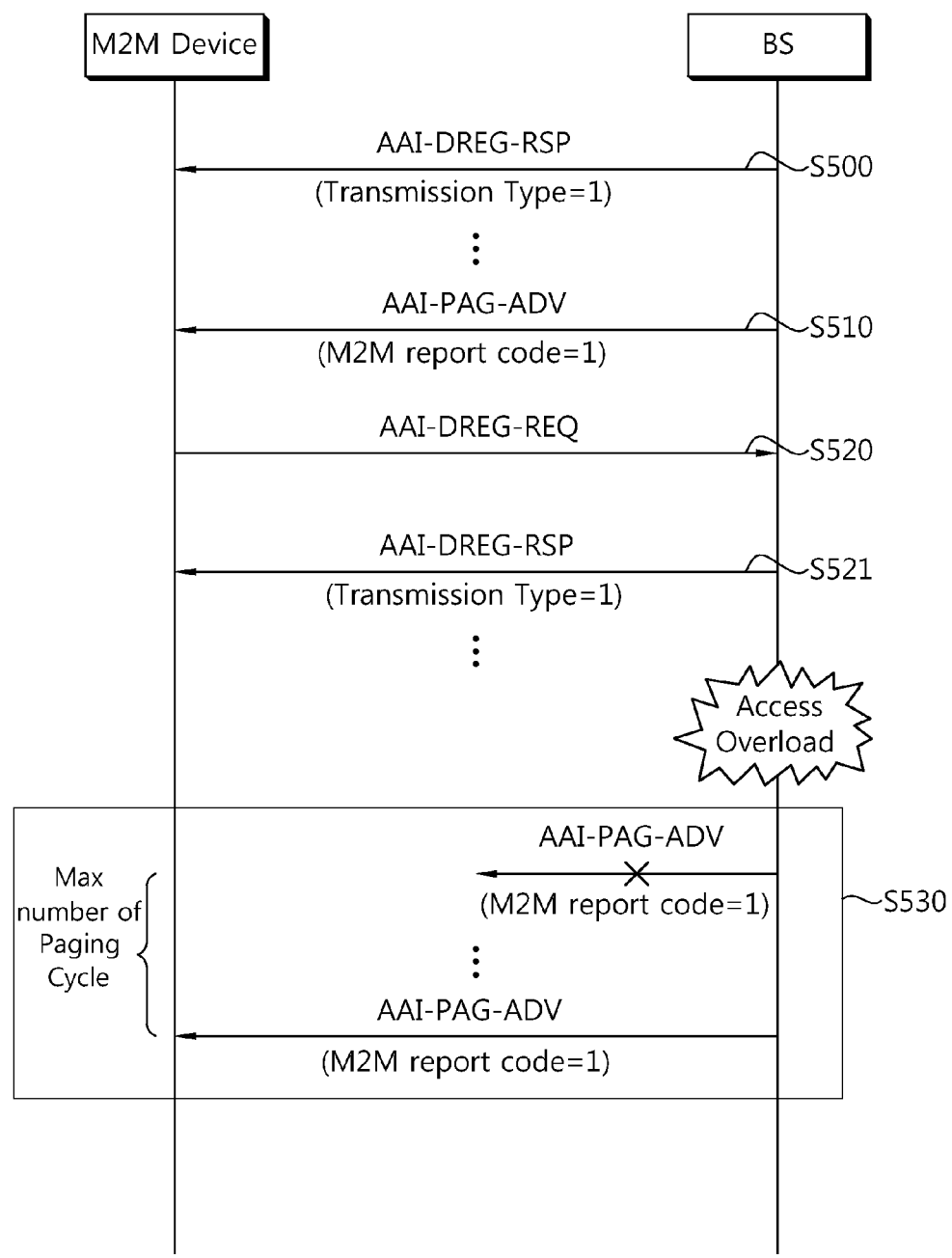
FIG. 12 shows another embodiment of the proposed UL data transmission method.

FIG. 12 shows another embodiment of the proposed UL data transmission method.

In step S500, a BS transmits to an M2M device an AAI-DREG-RSP message which is set to Transmission Type=1. In step S510, the BS transmits to the M2M device an AAI-PAG-ADV message which is set to M2M report code=0b1. Accordingly, an MS can transmit UL data to the BS. In step S520, the M2M device transmits the AAI-DREG-REQ message to the BS. In step S521, the BS transmits to the M2M device the AAI-DREG-RSP message which is set to Transmission Type=1.

In step S530, an access overload occurs. Accordingly, the BS does not transmit to the M2M device the AAI-PAG-ADV message which is set to M2M report code=0b1. The M2M device can wait for the AAI-PAG-ADV message which is set to M2M report code=0b1 during a period corresponding to (Max number of paging cycle×paging cycle). If the M2M device fails to receive the AAI-PAG-ADV message which is set to M2M report code=0b1 during the period corresponding to (Max number of paging cycle×paging cycle), the M2M device may attempt ranging for UL data transmission.

2) A method of controlling an access of the M2M device by reporting whether the M2M device can transmit UL data through the paging message will be described.

Figure 13:
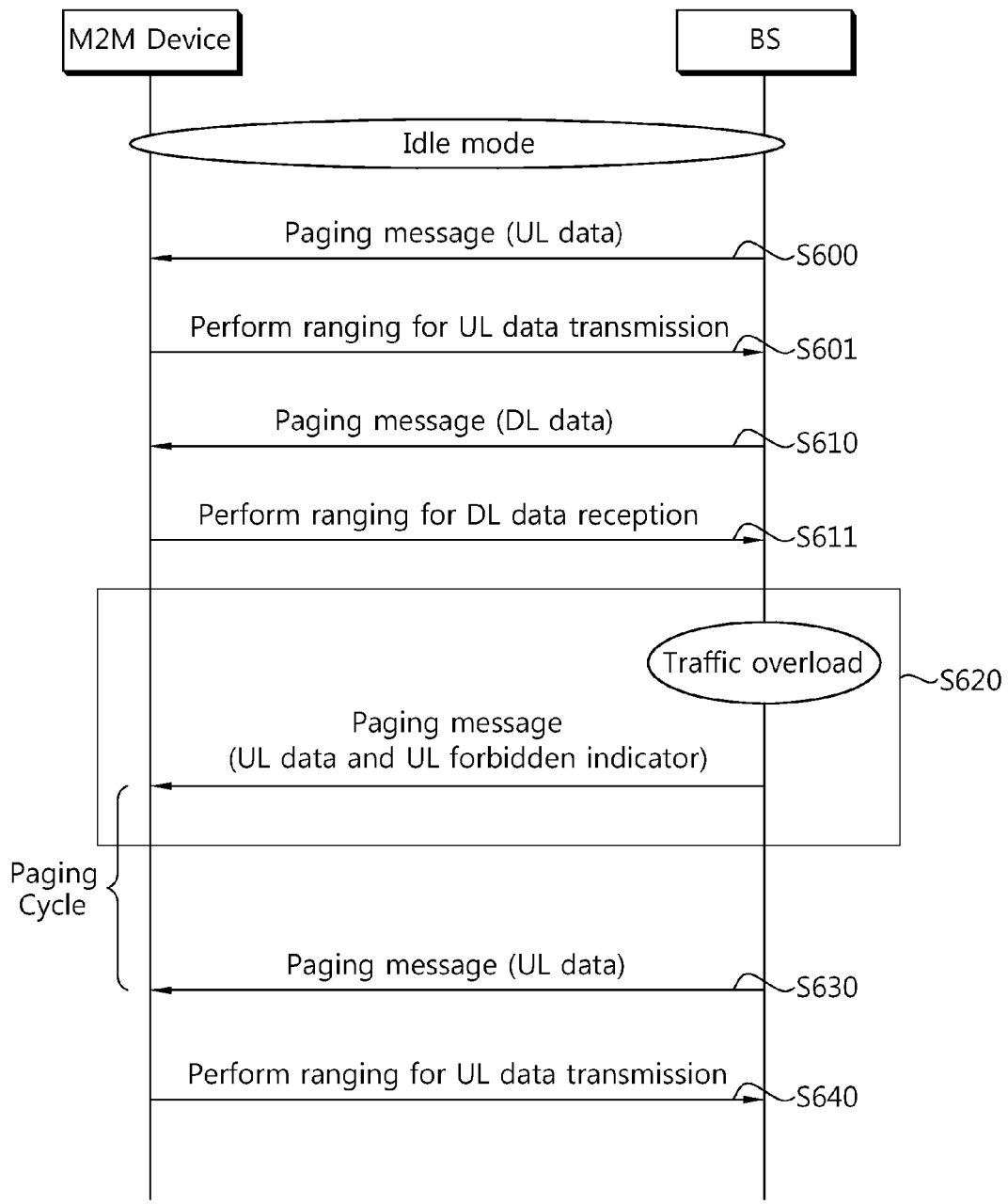
FIG. 13 shows another embodiment of the proposed UL data transmission method.

FIG. 13 shows another embodiment of the proposed UL data transmission method.

A BS can allow a paging message to include a UL forbidden indicator. Upon receiving the paging message including the UL forbidden indicator, the M2M device can wait for a pre-defined interval and then can receive a paging message for triggering UL data transmission and can transmit UL data.

Referring to FIG. 13, in step S600, the BS transmits to the M2M device the paging message for triggering UL data transmission. In step S601, the M2M device performs ranging on the BS to transmit the UL data. In a next paging cycle, i.e., in step S610, the BS transmits to the M2M device a paging message for DL data transmission. In step S611, the M2M device performs ranging on the BS to receive DL data.

In step S620, a traffic overload occurs. The BS transmits to the M2M device a paging message including a UL forbidden indicator. Upon receiving the paging message, the M2M device can postpone UL data transmission during a pre-defined interval. The pre-defined interval may be one paging cycle. In step S630, the BS transmits to the M2M device a paging message for triggering UL data transmission. In step S640, the M2M device attempts ranging on the BS to transmit UL data.

Figure 14:
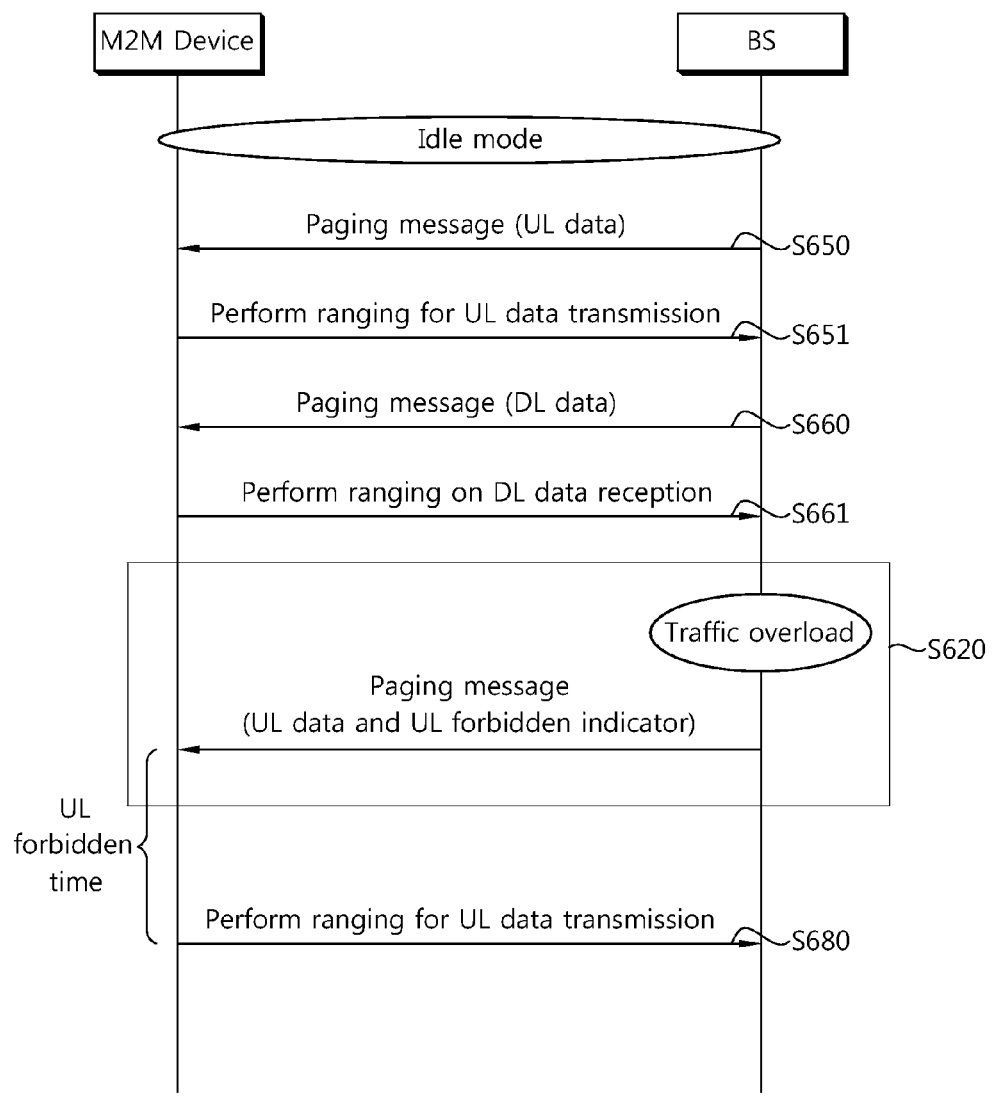
FIG. 14 shows another embodiment of the proposed UL data transmission method.

FIG. 14 shows another embodiment of the proposed UL data transmission method.

A BS can allow a paging message to include a UL forbidden time. Upon receiving the paging message including the UL forbidden time, the M2M device can wait for the UL forbidden time and then can transmit UL data.

Referring to FIG. 14, in step S650, the BS transmits to the M2M device the paging message for triggering UL data transmission. In step S651, the M2M device performs ranging on the BS to transmit the UL data. In a next paging cycle, i.e., in step S660, the BS transmits to the M2M device a paging message for DL data transmission. In step S661, the M2M device performs ranging on the BS to receive DL data.

In step S670, a traffic overload occurs. The BS transmits to the M2M device a paging message including a UL forbidden time. Upon receiving the paging message, the M2M device can postpone UL data transmission during the UL forbidden time. In step S680, the M2M device attempts ranging on the BS to transmit UL data.

Figure 15:
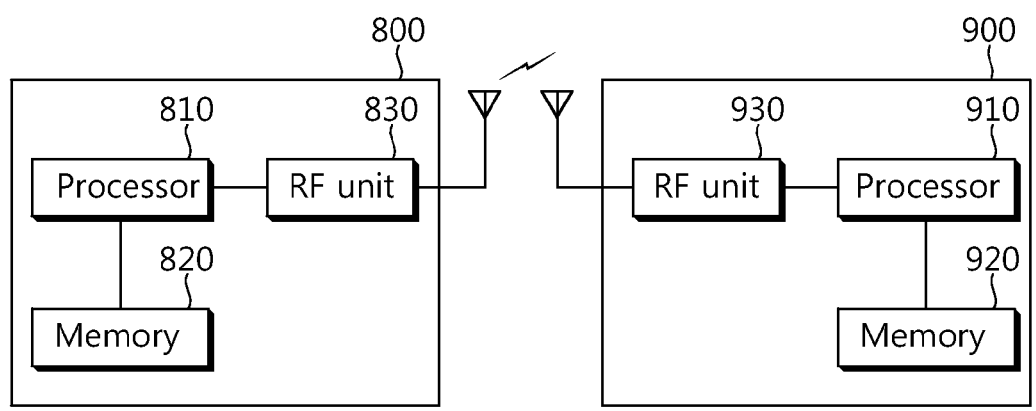
FIG. 15 is a block diagram showing wireless communication system to implement an embodiment of the present invention.

FIG. 15 is a block diagram showing wireless communication system to implement an embodiment of the present invention.

A BS 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An M2M device 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

A machine-to-machine (M2M) device can effectively transmit uplink data.

What is claimed is:

1. A method for transmitting, by a machine-to-machine (M2M) device, uplink (UL) data in a wireless communication system, the method comprising:

receiving, from a base station, a deregistration response message including a transmission type and a maximum number of paging cycle during an idle mode entry;

waiting to receive a paging message which triggers the M2M device to transmit the UL data during a period corresponding to up to (the maximum number of paging cycle×a length of paging cycle); and if the paging message which triggers the M2M device to transmit the UL data is not received within the period corresponding to up to (the maximum number of paging cycle×a length of paging cycle), transmitting, to the base station, the UL data without receiving the paging message.

2. The method of claim 1, wherein the transmission type is one bit.

3. The method of claim 2, wherein a value of the transmission type is 1.

4. The method of claim 3, wherein if the value of the transmission type is 1, the transmission type indicates that the UL data transmission is allowed only after the M2M device receives the paging message for the M2M device to transmit the UL data.

5. The method of claim 1, wherein the paging message includes an indicator which triggers the M2M device to transmit the UL data, and a value of the indicator is 1.

6. The method of claim 1, wherein the paging message is broadcast.

7. A machine-to-machine (M2M) device configured to transmit uplink (UL) data in a wireless communication system, the M2M device comprising:

a radio frequency (RF) transceiver configured to transmit or receive a radio signal; and a processor coupled to a memory and to the RF transceiver, and configured to:

receive a deregistration response message including a transmission type and a maximum number of paging cycle during an idle mode entry;

wait to receive a paging message which triggers the M2M device to transmit the UL data during a period corresponding to up to (the maximum number of paging cycle×a length of paging cycle); and if the paging message which triggers the M2M device to transmit the UL data is not received within the period corresponding to up to (the maximum number of paging cycle×a length of paging cycle), transmit the UL data without receiving the paging message.

8. The M2M device of claim 7, wherein the transmission type is one bit.

9. The M2M device of claim 8, wherein a value of the transmission type is 1.

10. The M2M device of claim 9, wherein if the value of the transmission type is 1, the transmission type indicates that the UL data transmission is allowed only after the M2M device receives the paging message for the M2M device to transmit the UL data.

11. The M2M device of claim 7, wherein the paging message includes an indicator which triggers the M2M device to transmit the UL data, and a value of the indicator is 1.

12. The M2M device of claim 7, wherein the paging message is broadcast.

* * * * *